US006633467B2

United States Patent
Macbeth et al.

(10) Patent No.: US 6,633,467 B2
(45) Date of Patent: Oct. 14, 2003

(54) AFCI WHICH DETECTS AND INTERRUPTS LINE SIDE ARCING

(75) Inventors: Bruce F. Macbeth, Syracuse, NY (US); Jeffrey C. Richards, Baldwinsville, NY (US)

(73) Assignee: Pass & Seymour, Inc., Syracuse, NY (US)

( * ) Notice: Subject to any disclaimer, the term of this patent is extended or adjusted under 35 U.S.C. 154(b) by 390 days.

(21) Appl. No.: 09/776,582

(22) Filed: Feb. 2, 2001

(65) Prior Publication Data

US 2001/0036047 A1 Nov. 1, 2001

Related U.S. Application Data

(60) Provisional application No. 60/179,988, filed on Feb. 3, 2000, and provisional application No. 60/195,168, filed on Apr. 6, 2000.

(51) Int. Cl.[7] .................................................. H02H 3/00
(52) U.S. Cl. ................... 361/42; 361/2; 361/8
(58) Field of Search ................... 361/42, 2, 8

(56) References Cited

U.S. PATENT DOCUMENTS 5,729,145 A * 3/1998 Blades ........................ 324/536
5,914,622 A * 6/1999 Inoue ......................... 327/172

* cited by examiner

*Primary Examiner*—Brian Sircus
*Assistant Examiner*—James A Demakis
(74) *Attorney, Agent, or Firm*—Wall, Marjama & Bilinski, LLP

(57) ABSTRACT

An arc fault causes the line voltage across the line terminals of an arc fault circuit interrupter (AFCI) to change its characteristic voltage pulse shape as the line voltage is momentarily removed from the AFCI terminals after the arc extinguishes and before it re-strikes by introducing a flat voltage portion to the pulse shape. This flat voltage portion changes the voltage pulse width. An arc detector/processor detects this change in pulse width to produce a signal indicative of upstream (line side) arcing. The flat voltage portion can also be detected using clamping diodes and charging capacitors.

50 Claims, 7 Drawing Sheets

AFCI WHICH DETECTS AND INTERRUPTS LINE SIDE ARCING

CROSS-REFERENCE TO RELATED APPLICATIONS

This application claims priority from U.S. Provisional Applications Serial Nos. 60/179,988 filed on Feb. 3, 2000 and 60/195,168 filed on Apr. 6, 2000, incorporated herein by reference.

FIELD OF THE INVENTION

The invention pertains to the field of arc fault detectors and interrupters, and in particular, to an arc fault interrupter which detects and interrupts line side series or parallel arcing.

BACKGROUND OF THE INVENTION

A percentage of fires each year are caused by electrical branch circuit wiring arcing faults involving currents below the trip level of a conventional circuit breaker or OCPD (over current protection device) as well as below the handling rate of the breaker. Basic overcurrent protection afforded by circuit breakers is designed to prevent $I^2R$ heating of the wiring in the electrical distribution system, caused by circuit overloading or line-to-line faults, and not necessarily arcing faults. A true short circuit is a rarity in an electrical system. In fact, it is more accurate to think of electrical faults as having some level of impedance, such as a high impedance arc fault (low current) or a low impedance fault (high current). Many electrical faults begin as high impedance breakdowns between the line and neutral conductors or to the ground wire or device components. AFCI (Arc Fault Circuit Interrupter) technology affords protection from conditions that may not necessarily be an immediate threat but could become hazardous if left unattended.

In order to start a fire, three elements must be present fuel, oxygen (air), and energy to ignite the fuel. Arcing is defined as a luminous discharge of electricity across an insulating medium. The electrical discharge of an arc can reach temperatures of several thousand degrees Celsius. Arcing produces sufficient energy to reach the ignition point of nearby combustible material(s) before a circuit breaker can respond. Arc detection is an enhancement to thermal magnetic overload detection typically used in circuit breakers or OCPD's, which alone may not detect and respond to arc faults.

A number of devices for detecting arc faults and methods of detection have been used in the past. These include using E and B field arc sensors, detecting the amplitude of the rate of change of current signals when an arc fault occurs, using non-overlapping band pass filters to detect white noise characteristic of arcs, and utilizing the high frequency components (RF) of arcing waveforms to detect arcing faults. While some of these techniques are more or less effective than others, they require relatively sophisticated arc sensors and circuits. Heretofore, most arc detection circuits have been incorporated in circuit breakers.

"A-type" arc faults are those in which the arc occurs across a break in the line or neutral conductors or at a loose terminal in a branch circuit of a distribution network. The conductors are carrying current to a load derived from the line voltage. The arc could likewise occur as a break or at a loose terminal associated with an extension cord deriving power from line voltage, thereby completing the circuit to the load. Since the current through the A-type fault is limited by the impedance of the load itself, since the fault is in series with the load, an A-type fault is also known as a "series fault."

"B-type" arc faults are a second arcing condition that must be detected and interrupted by a combination outlet device. In a B-type fault, the arc occurs across two conductors in the branch circuit or extension cords plugged into it, at a site where the insulating media separating the two conductors has been compromised. The arc may occur across the line and neutral conductors or the line and ground conductors, or in the case of reverse polarity where the line voltage is reverse-polarized, between the neutral and ground conductors. The current through the B-type fault is not limited by the impedance of the load, but rather by the available current from the supply established by the impedance of the conductors and terminals between the source of line voltage and the position of the parallel fault, i.e., the conductive members carrying the fault current. Since B-type faults are effectively across the line, they are also known as "parallel faults."

There is a need for simple economical arc fault detectors that can be included in wiring devices such as duplex receptacles, multi-outlet strips, or in-line devices, and that offer the same protection as an arc fault detector incorporated in a circuit breaker but at lower cost. There is a need for an arc fault circuit detector in wiring devices that can be provided at a reduced cost compared with arc fault circuit detecting circuit breakers comparable to the reduction in cost between ground fault interrupting receptacles and ground fault interrupting circuit breakers.

SUMMARY OF THE INVENTION

Briefly stated, An arc fault causes the line voltage across the line terminals of an arc fault circuit interrupter (AFCI) to change its characteristic voltage pulse shape as the line voltage is momentarily removed from the AFCI terminals after the arc extinguishes and before it re-strikes by introducing a flat voltage portion to the pulse shape. This flat voltage portion changes the voltage pulse width. An arc detector/processor detects this change in pulse width to produce a signal indicative of upstream (line side) arcing. The flat voltage portion can also be detected using clamping diodes and charging capacitors.

According to an embodiment of the invention, an arc fault detector operatively connected to first and second lines of an AC electric power distribution system includes first means for determining a first width of a voltage pulse of a line voltage across the first and second lines in an absence of an arc fault on a line side of the arc fault detector; second means for determining a second width of a voltage pulse of the line voltage across the first and second lines in a presence of the arc fault on the line side of the arc fault detector; comparison means for comparing the first width to the second width; and means for producing a signal when the first width exceeds the second width for a predetermined number of line cycles of the line voltage.

According to an embodiment of the invention, an arc fault detector operatively connected to first and second lines of an AC electric power distribution system includes means for sampling a voltage pulse of a line voltage across the first and second lines on a line side of the arc fault detector; and means for determining when the voltage pulse changes from a normal sine wave to an abnormal sine wave characterized by a flat voltage region, thereby indicating an arc fault.

According to an embodiment of the invention, an arc fault detector operatively connected to first and second lines of an AC electric power distribution system includes means for determining a width of a voltage pulse of a line voltage across the first and second lines in a presence of an arc fault on a line side of the arc fault detector; comparison means for comparing the width to a width constant held in a memory; and means for producing a signal when the width exceeds the width constant.

According to an embodiment of the invention, an arc fault detector operatively connected to first and second lines of an AC electric power distribution system includes first means for detecting a shift from a sine waveform to a flat top waveform which has a voltage level between two predetermined levels for a predetermined interval during a half wave; second means for detecting the shift for a predetermined number of half waves; and means, responsive to the first and second means, for producing a signal.

DETAILED DESCRIPTION OF THE PREFERRED EMBODIMENT

Figure 1:
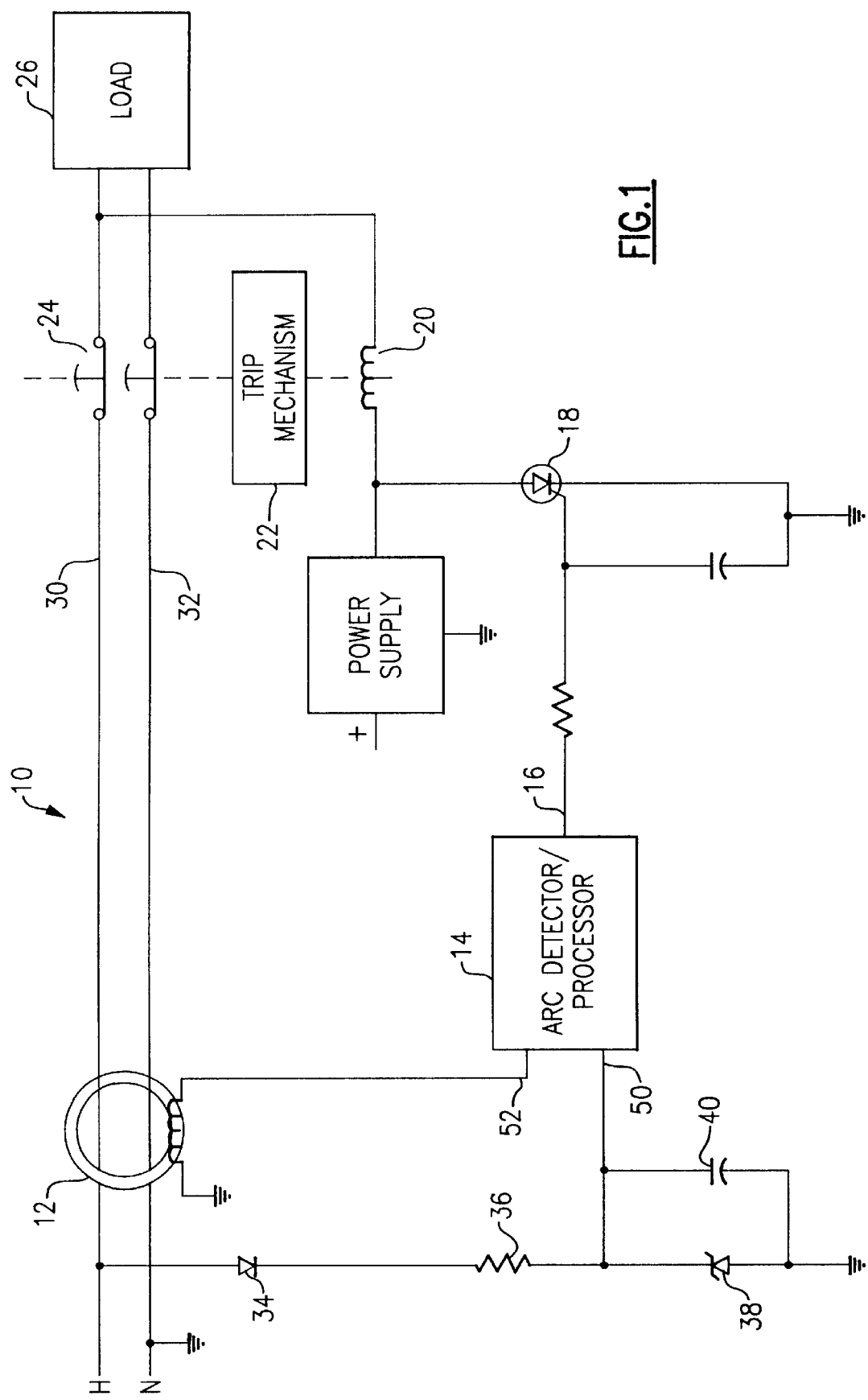
FIG. 1 shows a schematic diagram of an embodiment of the invention.

Referring to FIG. 1, an arc fault circuit interrupter (AFCI) 10 includes an arc sensor 12 connected to an arc detector/processor 14. Arc sensor 12 is preferably asymmetrically wound such that the field produced by one of the electrical power line conductors such as a line hot 30 or a line neutral 32 produces more sensor pickup response than the other conductor. An output 16 of arc detector/processor 14 drives a gate of a switch, such as an SCR 18 to activate the switch. When SCR 18 is activated, a solenoid 20 is energized which in turn activates a trip mechanism 22. Trip mechanism 22 opens a contact interrupter 24, thus disconnecting a load 26 from line hot 30 and line neutral 32. AFCI 10 also includes a diode 34 which rectifies the line voltage between line hot 30 and line neutral 32. A resistor 36 drops the rectified voltage from diode 34 in order to clamp a Zener diode 38, whose clamped voltage is preferably noise impulse filtered by including a capacitor 40 in conjunction with a bleeder resistor internal to arc detector/processor 14.

Figure 2A:
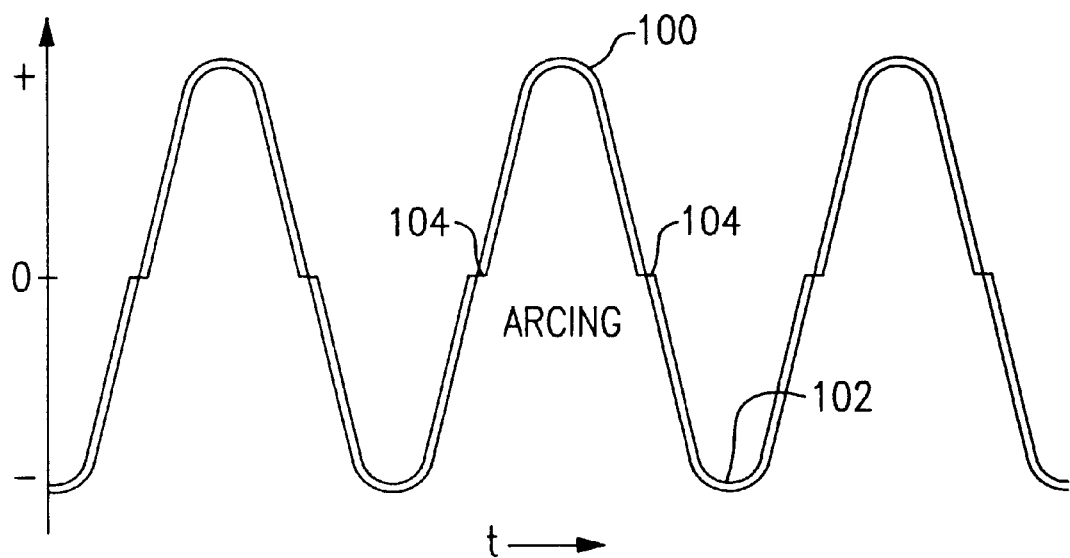
FIG. 2A shows a waveform of the line side AC sine wave with no series arcing.
Figure 2B:
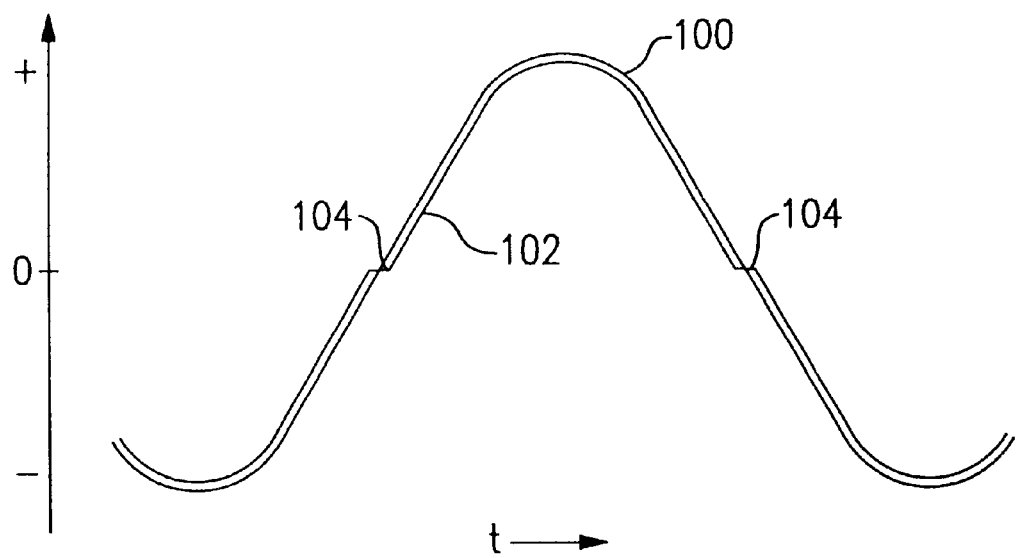
FIG. 2B shows a waveform of the line side AC sine wave with series arcing.

Referring to FIGS. 2A–2B, a waveform 100 is shown which is the line side AC sine wave without series arcing. Waveform 100 also depicts the line side AC sine wave upstream of a series arc when arcing occurs. A waveform 102 is shown which is the voltage appearing across line hot 30 and line neutral 32 downstream of the series arc during line side series arcing. Note two flat portions 104 of waveform 102 which occur as the arc is extinguished when the line voltage sine wave passes through zero before the arc re-strikes across the arc gap. Flat portions 104 are extended zero cross identifiers.

Figure 3A:
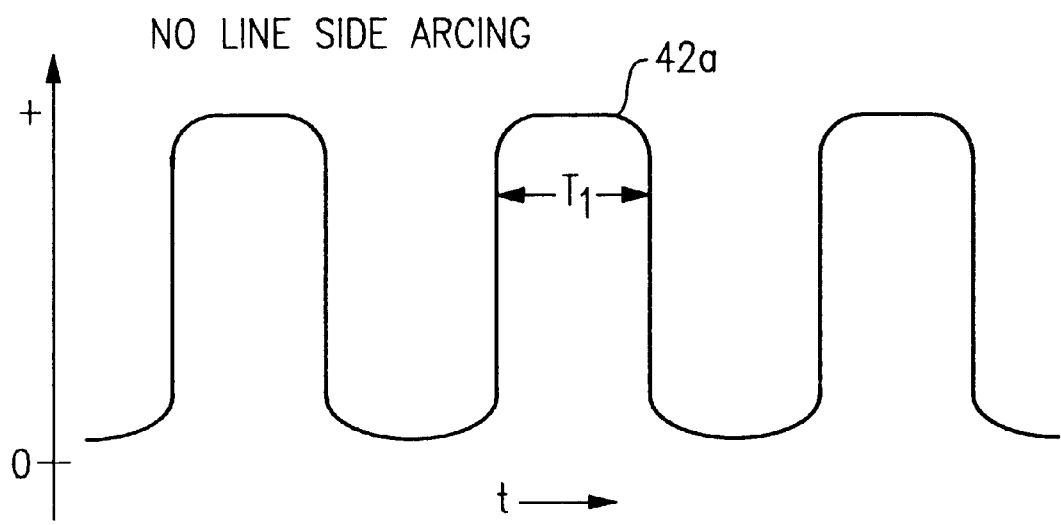
FIG. 3A shows a voltage pulse across a clamping diode with no series arcing.
Figure 3B:
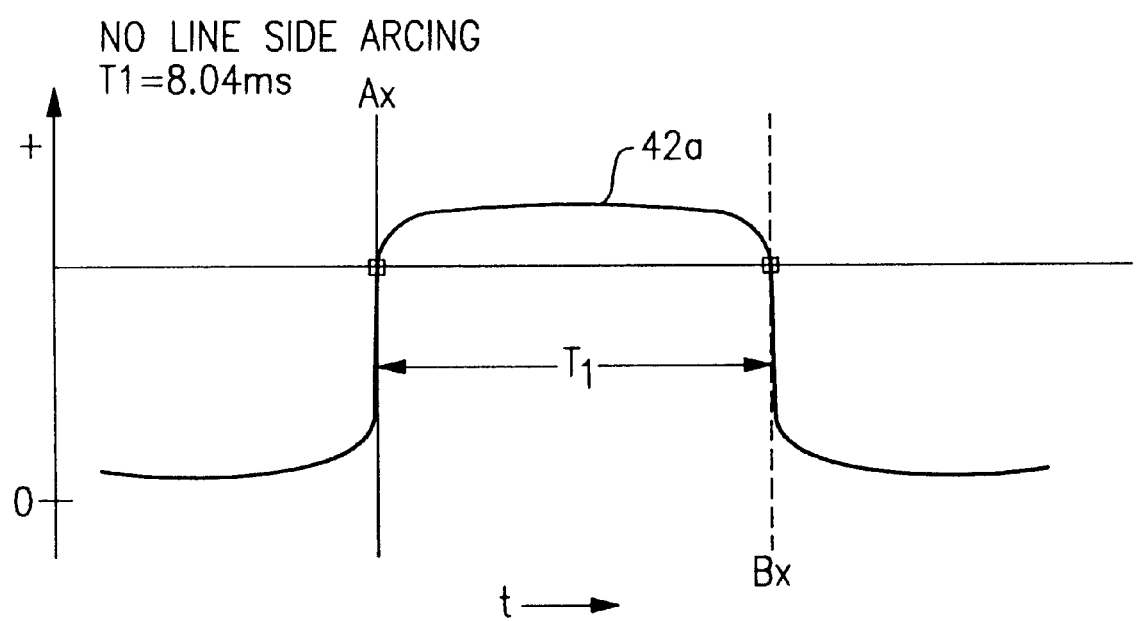
FIG. 3B shows an enlarged view of a portion of FIG. 3A.

Referring to FIGS. 3A–3B, the voltage across Zener diode 38 when no line side series arcing occurs. The voltage has a time width which is proportional to the time of one half cycle of the line voltage. The clamped voltage across Zener diode 38 forms a pulse 42a with a width T1 that forms an input 50 into arc detector/processor 14. As shown in FIGS. 3A–3B, T1 is 8.04 ms.

Figure 4A:
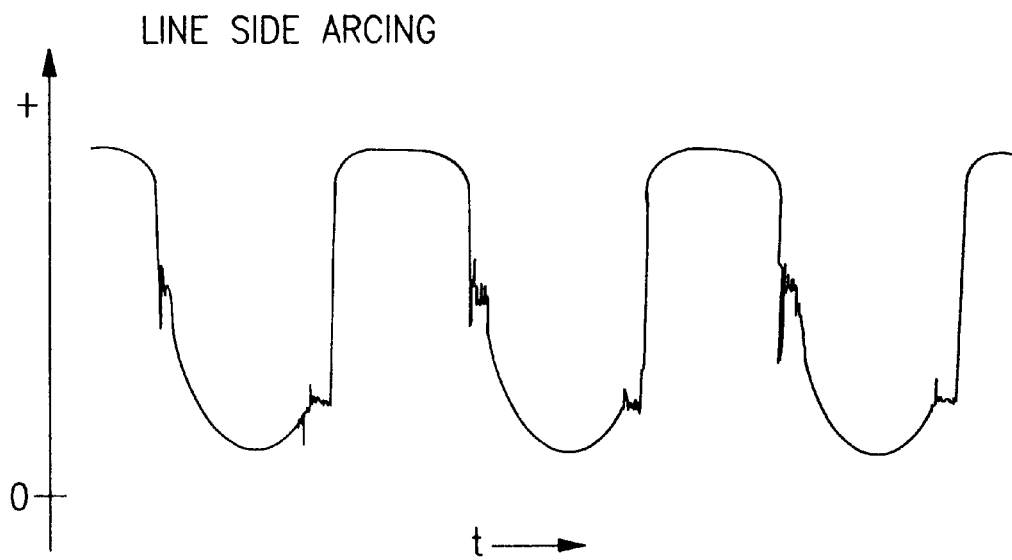
FIG. 4A shows a voltage pulse across the clamping diode with series arcing.
Figure 4B:
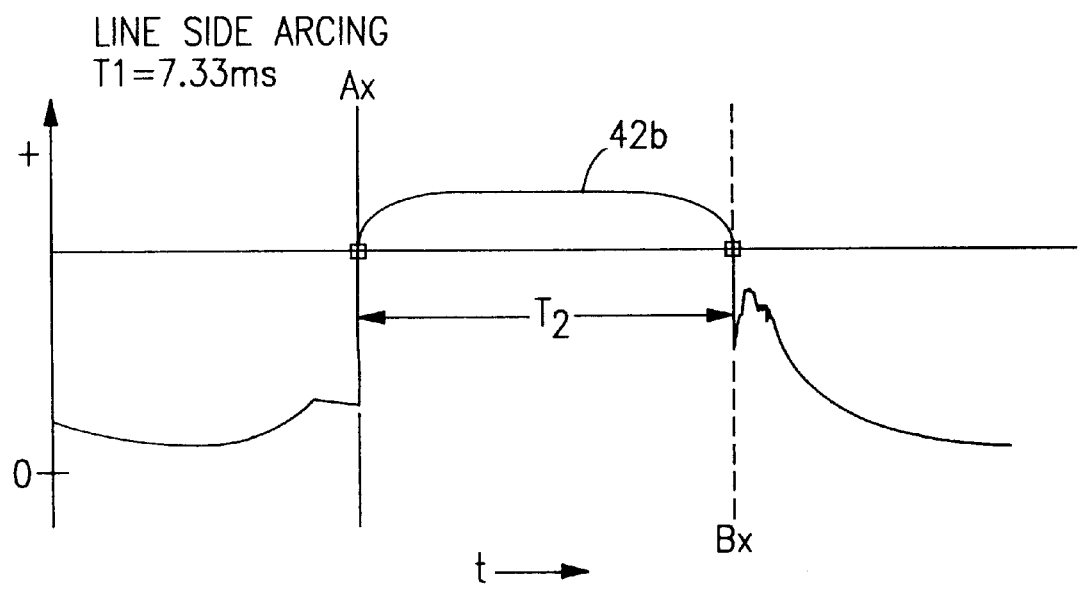
FIG. 4B shows an enlarged view of a portion of FIG. 4A.

Referring to FIGS. 4A–4B, the clamped voltage across Zener diode 38 is shown when line side series arcing occurs. A pulse 42b has a width T2 which is less than T1 since the width of the pulse is reduced when line side series arcing is present. In FIGS. 4A–4B, the width of T2 is 7.33 ms.

Arc detector/processor 14 measures the width of the pulses of input 50 and activates SCR 18 if a reduced pulse width persists for a predetermined number of line cycles at a predetermined indicating width, and preferably for a predetermined time.

Referring momentarily back to FIG. 1, arc sensor 12 detects the rate of change, or di/dt, of the line current and provides an input 52 to arc detector/processor 14. Since a series arc is sustained by the current passing through the arc, upstream series arcing always produces di/dt steps in the current when the arc re-strikes and extinguishes. In an alternative embodiment, arc detector/processor 14 must sense a series of reduced pulse widths at input 50 in combination with the series arc detection pulses at input 52 before SCR 18 is activated. That is, signals 50 and 52 must both be present and of the correct signature before SCR 18 is activated.

Figure 5A:
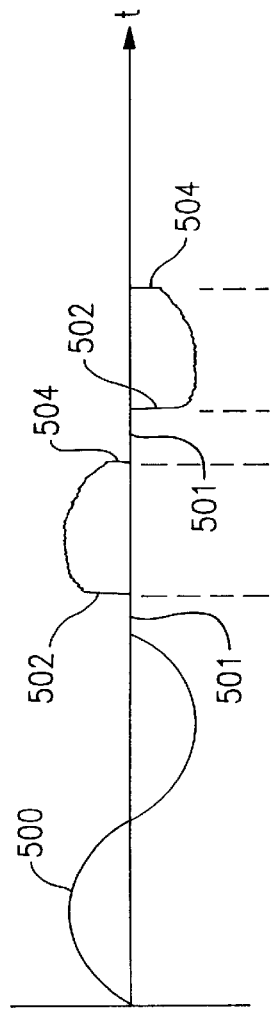
FIG. 5A shows the line voltage waveform at the input to the invention during upstream series arcing.

Referring to FIG. 5A, a line voltage waveform 500 across line hot 30 and line neutral 32 during upstream series arcing is shown, with a step in voltage 502 at the start of the arc. A step in voltage 504 and a flat 501 are caused when the arc extinguishes. Waveform 500 is the line voltage supplying current to the load 26, and the steps in the line voltage also cause analogous steps to 502 and 504 in the load current.

Figure 5B:
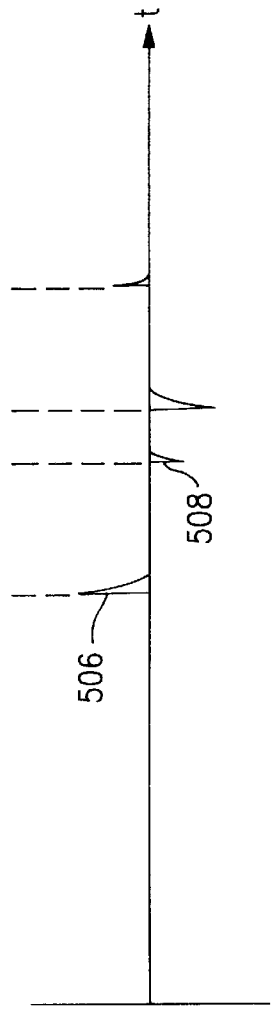
FIG. 5B shows the output pulses of the di/dt current sensor during upstream series arcing.

Referring to FIG. 5B, the signal input 52 to arc detector/processor 14 arriving from sensor 12 is shown. As the sensor responds to the di/dt steps in load current at 502 and 504, pulses 506 and 508 are produced. If either of pulses 506 or 508, or both, occur in proximity to, or concurrently with flat 501, then arc detector/processor 14 issues a trip command to SCR 18 after a predetermined number of proximities or concurrences occur.

Figure 6:
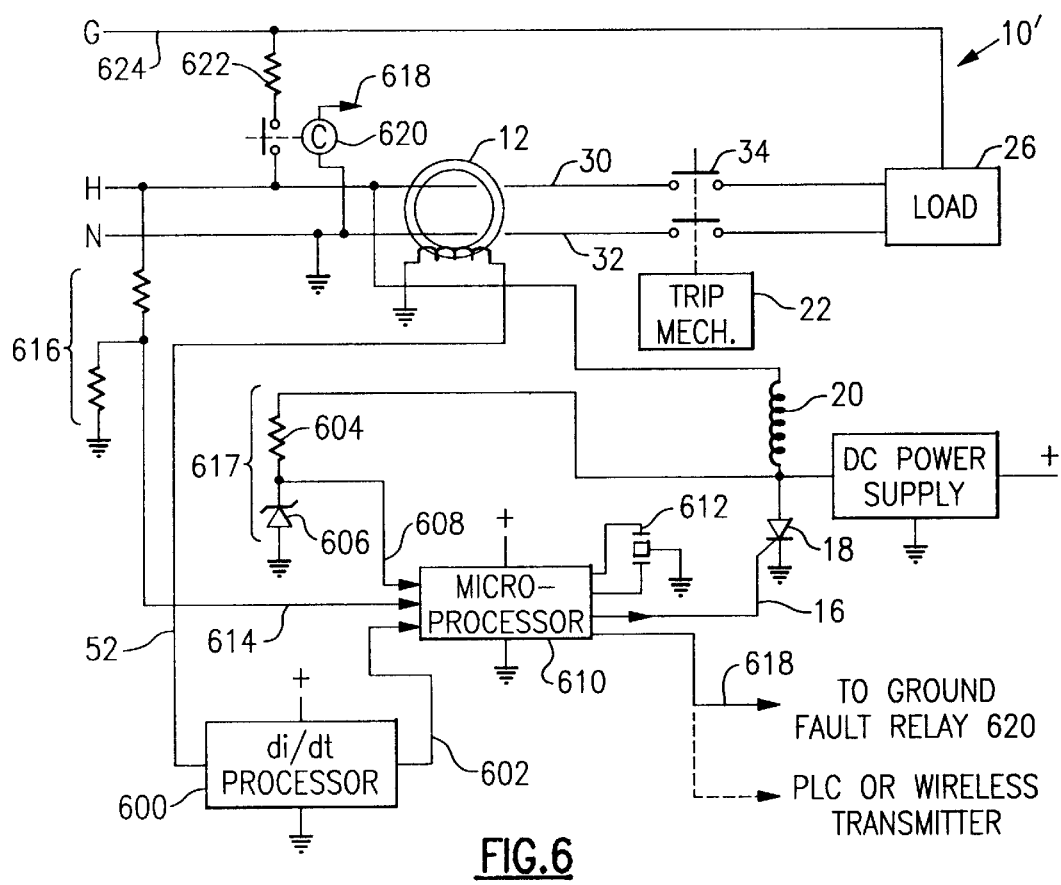
FIG. 6 shows a schematic diagram of an embodiment of the invention.

Referring to FIG. 6, according to an embodiment of the invention, an AFCI 10' is shown which detects series upstream arc faults as well as series and parallel downstream arc faults. Elements similar to like elements in FIG. 1 are like numbered. A micro processor 610 has an input 602 which is a processed di/dt signal arriving from a di/dt processor 600. Processor 600 converts the di/dt signal arriving form current sensor 12 into a form suitable for microprocessor 610 input 602. Steps in the line current caused by either upstream or downstream arc faults produce the di/dt pulse shown in FIG. 5B. Microprocessor 610 also has a zero cross pulse as an input 608. Zero cross pulse 608 is preferably produced by a voltage divider 617 consisting of a resistor 604 and a Zener diode clamp 606. Voltage divider 617 is connected to one side of solenoid 20, solenoid 20 providing noise immunity, with the other side of solenoid 20 connected to line hot 30. This arrangement produces a clamped pulse which has a width proportional to the positive line voltage half wave. The zero cross pulse on microprocessor input 608 is used as a reference for the start of the positive voltage half wave and is used by microprocessor 610 as a reference as to where in the voltage half wave the di/dt pulse occurs on input 602, and also as to how many pulses occur in the half cycle, etc. By determining di/dt pulse information with respect to the voltage zero cross, the microprocessor 610 algorithm can use this data to help discern downstream arc di/dt from noise di/dt which could cause false activation of trip SCR 18.

Figure 7A:
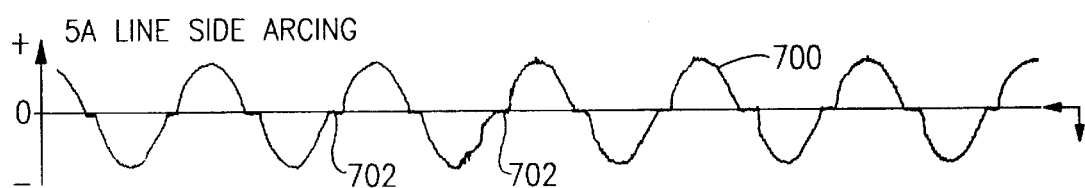
FIG. 7A shows a waveform used in explaining the embodiment of FIG. 6.
Figure 7B:
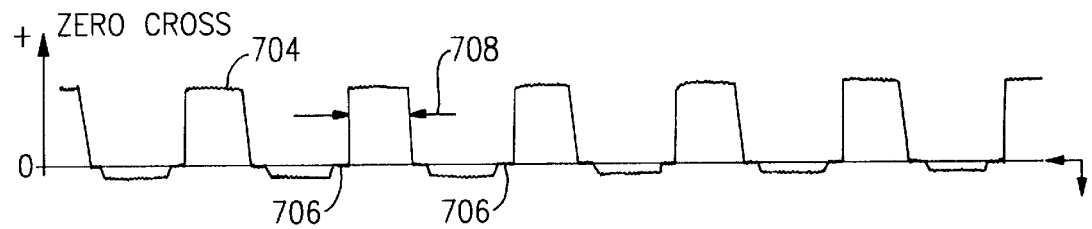
FIG. 7B shows a waveform used in explaining the embodiment of FIG. 6.
Figure 9:
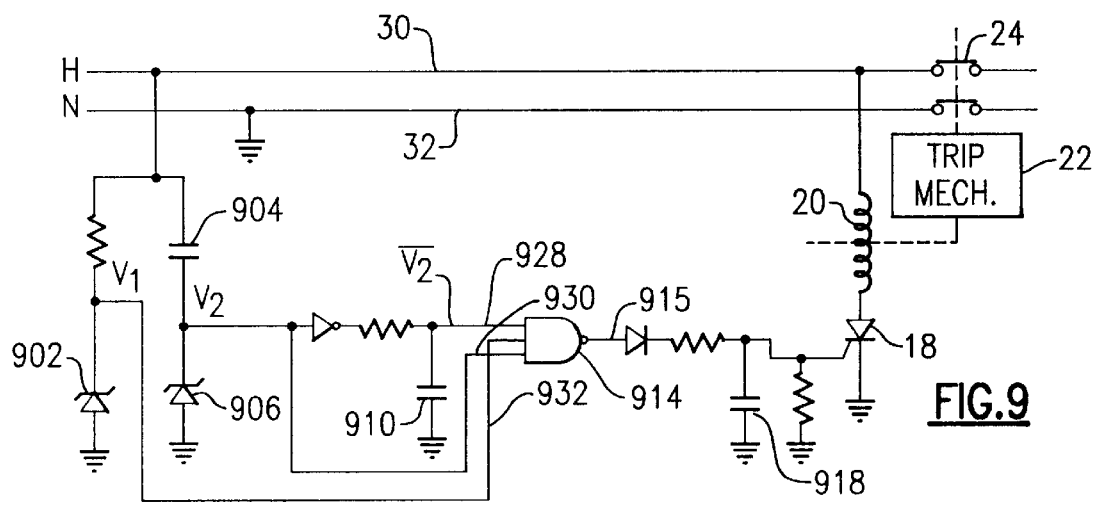
FIG. 9 shows a schematic diagram of an embodiment of the invention.
Figure 10A:
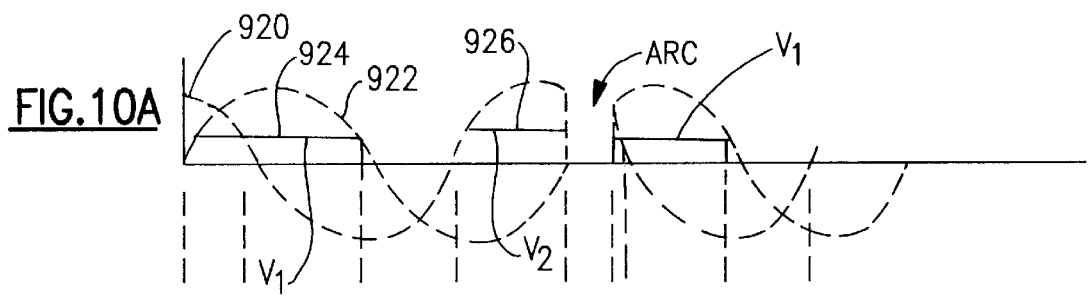
FIG. 10A shows a waveform used in explaining the embodiment of FIG. 9.
Figure 10B:
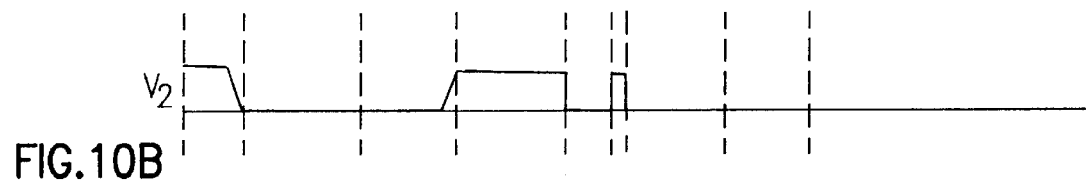
FIG. 10B shows a waveform used in explaining the embodiment of FIG. 9.
Figure 10C:
FIG. 10C shows a waveform used in explaining the embodiment of FIG. 9.
Figure 10D:
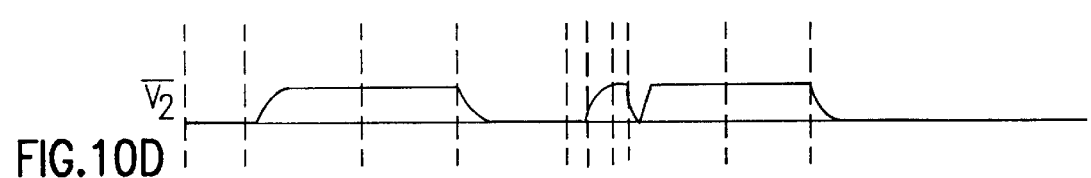
FIG. 10D shows a waveform used in explaining the embodiment of FIG. 9.
Figure 10E:
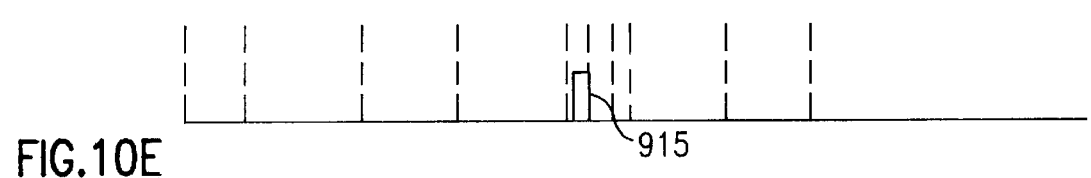
FIG. 10E shows a waveform used in explaining the embodiment of FIG. 9.

Referring to FIGS. 7A–7B, a waveform 700 which is the line voltage waveform in the presence of upstream series arcing is shown. A useful byproduct of obtaining the zero cross pulse in circuit 10' is that the zero cross pulse can be analyzed for flats in the line voltage caused by series upstream arcing as described above. A waveform 704 is the zero cross pulse which is input 608 to microprocessor 610 in FIG. 6. Flats 706 produce a shrinkage in a pulse width 708, the shrinkage indicating upstream series arcing. Microprocessor 610 constantly measures the width of the zero cross pulse and compares it to a constant held in microprocessor 610 memory. If the width shrinks by a predetermined amount in a predetermined number of half line cycles, but not necessarily concurrent half line cycles, then microprocessor 610 issues a trip signal as output 16, activating trip SCR 18.

Figure 8:
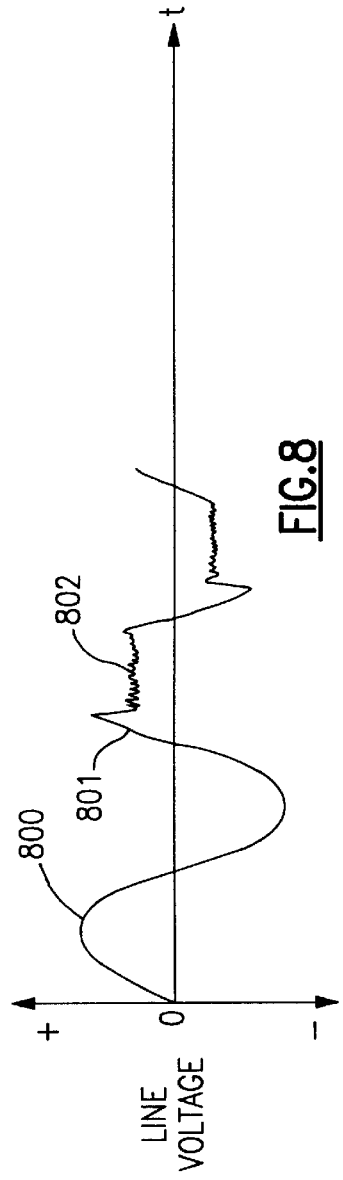
FIG. 8 shows the line voltage at the input to the invention during parallel upstream arc faults.

Referring to FIGS. 8 and 6, the condition of the line voltage across AFCI 10' during parallel upstream arcing is shown. This type of arcing, also known as a "B-type" arc fault, has full line voltage across the AFCI 10 line terminals until the line voltage falls to that of the parallel arc shown at 802 on a voltage waveform 800. The voltage appearing across a voltage divider 616 falls proportionally to the line voltage. The output of voltage divider 616 is connected as an input to an analog to digital converter (ADC) input 614 on microprocessor 610. When ADC input 614 detects a shift from a sine waveform to a flat top waveform which has a voltage level between two predetermined levels for a predetermined interval during a half wave, or a shift to a partial sine wave at the beginning of a half cycle, as shown at 801, followed by the flat top waveform, and detects these shifts for a predetermined number of half waves, microprocessor 610 then outputs a signal 618 that can be used for a variety of purposes. One purpose is to activate a crowbar across the line terminals to clear the circuit breaker for the branch circuit. Another purpose is to introduce a ground fault by activating a relay 620 which connects a resistor 622 between line hot 30 and a line ground 624, which ground fault is preferably used to activate a GFCI branch breaker or main breaker upstream of the arc to clear the parallel arc fault. Alternatively, the signal can be used to trigger a command signal to an upstream circuit breaker upstream of the arc, using a signal wire or PLC (power line carrier) transmission, or a wireless transmission, to carry the command signal to the upstream circuit breaker to interrupt the parallel arc fault. In addition, ADC input 614 is optionally used to detect voltage flats in the line voltage below a predetermined level, thereby indicating upstream series arcing, and to issue a trip command if this condition persists for a predetermined flat indicating width for a predetermined number of half line cycles, not necessarily concurrent, over a predetermined period of time.

Referring to FIGS. 9 and 10A–10E, an embodiment of the invention uses a different method to detect the line voltage flat portions 104 of a series line arc (FIGS. 2A–2B). During the positive half cycle of a line voltage 922, a clamped voltage V1 as shown in waveform 924 is produced across a Zener clamp 902. A line voltage 920 is phase shifted by a capacitor 904, which drives a Zener clamp 906, producing a clamped voltage V2 as shown in waveform 926. During normal operation, and just after the positive cycle voltage zero cross, both clamp voltages V1 and V2 are high. During a line side series arc fault, shown in FIG. 10A, both clamp voltages V1 and V2 are low. This is a unique state which does not normally occur during a positive line voltage half wave, and is used to detect line side series arcing. Arcing causes the following to be observed. V1 must be low, V2 must be low, and V2 must have just been high. The previous V2 bar state is stored by a capacitor 910. If V1=V2=V2 bar (delayed)=0, then arcing is present. A NAND gate 914 receives V1 as an input 932, V2 as an input 930, and V2 bar (delayed) as an input 928. When arcing is present, NAND gate 914 outputs a pulse 915. A sufficient number of pulses 915 charge a capacitor 918 to fire SCR 18.

While the present invention has been described with reference to a particular preferred embodiment and the accompanying drawings, it will be understood by those skilled in the art that the invention is not limited to the preferred embodiment and that various modifications and the like could be made thereto without departing from the scope of the invention as defined in the following claims.

What is claimed is:

1. An arc fault detector operatively connected to first and second lines of an AC electric power distribution system, comprising:

first means for determining a first width of a voltage pulse of a line voltage across said first and second lines in an absence of an arc fault on a line side of said arc fault detector;

second means for determining a second width of a voltage pulse of said line voltage across said first and second lines in a presence of said arc fault on said line side of said arc fault detector;

comparison means for comparing said first width to said second width; and means for producing a signal when said first width exceeds said second width for a predetermined number of line cycles of said line voltage.

2. An arc fault detector according to claim 1, further comprising interrupting means, responsive to said signal, for interrupting current in said first and second lines.

3. An arc fault detector according to claim 2, wherein said interrupting means interrupts current to a load.

4. An arc fault detector according to claim 2, wherein said interrupting means interrupts current by activating a crowbar across said first and second lines, thereby creating a short circuit between said first and second lines to activate a circuit breaker upstream of a location of said detected arc fault.

5. An arc fault detector according to claim 2, wherein said interrupting means interrupts current by introducing a ground fault into a GFCI breaker upstream of a location of said detected arc fault.

6. An arc fault detector according to claim 2, wherein said interrupting means interrupts current by triggering a command signal to activate a circuit breaker upstream of a location of said detected arc fault.

7. An arc fault detector according to claim 6, wherein said command signal is carried to said circuit breaker by power line carrier transmission.

8. An arc fault detector according to claim 1, further comprising:
   an arc sensor operatively connected to said first and second lines; and
   detection means for detecting series arc detection pulses from said arc sensor;
   wherein said means for producing said signal only produces said signal if said series arc detection pulses are detected by said detection means simultaneously with said first width exceeding said second width for said predetermined number of line cycles of said line voltage.

9. An arc fault detector according to claim 8, further comprising interrupting means, responsive to said signal, for interrupting current in said first and second lines.

10. An arc fault detector according to claim 1, wherein said first means, said second means, said comparison means, and said means for producing a signal comprise, in combination:
    a Zener clamping diode connected between said first line and a reference potential; and
    an arc detector/processor receiving a voltage across said Zener clamping diode as an input.

11. An arc fault detector according to claim 10, wherein said first means, said second means, said comparison means, and said means for producing a signal further comprise:
    a rectifier diode in series between said Zener clamping diode and said first line; and
    a resistance in series between said Zener clamping diode and said first line.

12. An arc fault detector operatively connected to first and second lines of an AC electric power distribution system, comprising:
    means for sampling a waveform of a line voltage across said first and second lines on a line side of said arc fault detector; and
    means for determining when said waveform changes from a normal sine wave to an abnormal sine wave characterized by a flat voltage region, thereby indicating an arc fault.

13. An arc fault detector according to claim 12, further comprising means, responsive to said means for determining, for producing a signal determinative of an arc fault.

14. An arc fault detector according to claim 13, further comprising interrupting means, responsive to said signal, for interrupting current in said first and second lines.

15. An arc fault detector according to claim 12, wherein said means for determining includes means for determining both upstream and downstream series arcing.

16. An arc fault detector according to claim 15, wherein said means for determining includes means for determining upstream parallel arcing.

17. An arc fault detector according to claim 12, wherein said means for determining includes means for determining upstream parallel arcing.

18. An arc fault detector according to claim 12, wherein said means for sampling and said means for determining comprise, in combination:
    a first Zener clamp in series with a limiting impedance between said first line and said second line producing a first clamping voltage;
    a capacitor and a second Zener clamp in series between said first line and second line producing a second clamping voltage phase shifted from said first clamping voltage;
    means for storing a delayed value of said second clamping voltage for a specified period of time;
    means for detecting, during a line voltage zero cross, when said first clamping voltage and said second clamping voltage are both HIGH, no arc fault is present, and when said first and second clamping voltages are both LOW and said delayed value of said second clamping voltage is LOW, an arc fault is present.

19. An arc fault detector according to claim 18, further comprising means, responsive to said means for detecting, for producing a signal determinative of an arc fault.

20. An arc fault detector according to claim 19, further comprising interrupting means, responsive to said signal, for interrupting current in said first and second lines.

21. An arc fault detector operatively connected to first and second lines of an AC electric power distribution system, comprising:
    means for determining a width of a voltage pulse of a line voltage across said first and second lines in a presence of an arc fault on a line side of said arc fault detector;
    comparison means for comparing said width to a width constant held in a memory; and
    means for producing a signal when said width exceeds said width constant.

22. An arc fault detector according to claim 21, wherein said means for producing a signal produces a signal only when said width exceeds said width constant for a predetermined number of line cycles of said line voltage.

23. An arc fault detector according to claim 22, further comprising interrupting means, responsive to said signal, for interrupting current in said first and second lines.

24. An arc fault detector according to claim 21, further comprising interrupting means, responsive to said signal, for interrupting current in said first and second lines.

25. An arc fault detector according to claim 24, wherein said interrupting means interrupts current to a load.

26. An arc fault detector according to claim 24, wherein said interrupting means interrupts current by activating a crowbar across said first and second lines, thereby creating a short circuit between said first and second lines to activate a circuit breaker upstream of a location of said detected arc fault.

27. An arc fault detector according to claim 24, wherein said interrupting means interrupts current by introducing a ground fault into a GFCI breaker upstream of a location of said detected arc fault.

28. An arc fault detector according to claim 24, wherein said interrupting means interrupts current by triggering a command signal to activate a circuit breaker upstream of a location of said detected arc fault.

29. An arc fault detector according to claim 28, wherein said command signal is carried to said circuit breaker by power line carrier transmission.

30. An arc fault detector operatively connected to first and second lines of an AC electric power distribution system, comprising:

first means for detecting a shift from a sine waveform to a flat top waveform which has a voltage level between two predetermined levels for a predetermined interval during a half wave;

second means for detecting said shift for a predetermined number of half waves; and means, responsive to said first and second means, for producing a signal.

31. An arc fault detector according to claim 30, further comprising interrupting means, responsive to said signal, for interrupting current in said first and second lines.

32. An arc fault detector according to claim 31, wherein said interrupting means interrupts current to a load.

33. An arc fault detector according to claim 31, wherein said interrupting means interrupts current by activating a crowbar across said first and second lines, thereby creating a short circuit between said first and second lines to activate a circuit breaker upstream of a location of said detected arc fault.

34. An arc fault detector according to claim 31, wherein said interrupting means interrupts current by introducing a ground fault into a GFCI breaker upstream of a location of said detected arc fault.

35. An arc fault detector according to claim 31, wherein said interrupting means interrupts current by triggering a command signal to activate a circuit breaker upstream of a location of said detected arc fault.

36. An arc fault detector according to claim 35, wherein said command signal is carried to said circuit breaker by power line carrier transmission.

37. An arc fault detector operatively connected to first and second lines of an AC electric power distribution system, comprising:

means for producing a first signal proportional to the AC power line voltage;

means for producing a second signal phase shifted from said AC power line voltage;

comparison means for comparing said first and second signals; and means for producing a detection signal when a magnitude of said first and second signals are simultaneously LOW.

38. An arc fault detector according to claim 37, further comprising interrupting means, responsive to said signal, for interrupting current in said first and second lines.

39. An arc fault detector according to claim 38, wherein said interrupting means interrupts current to a load.

40. An arc fault detector according to claim 38, wherein said interrupting means interrupts current by activating a crowbar across said first and second lines, thereby creating a short circuit between said first and second lines to activate a circuit breaker upstream of a location of said detected arc fault.

41. An arc fault detector according to claim 38, wherein said interrupting means interrupts current by introducing a ground fault into a GFCI breaker upstream of a location of said detected arc fault.

42. An arc fault detector according to claim 38, wherein said interrupting means interrupts current by triggering a command signal to activate a circuit breaker upstream of a location of said detected arc fault.

43. An arc fault detector according to claim 42, wherein said command signal is carried to said circuit breaker by power line carrier transmission.

44. An arc fault detector operatively connected to first and second lines of an AC electric power distribution system, comprising:

first means for detecting a shift from a sine waveform to a flat top waveform after a beginning of a half cycle of AC electric power, wherein said flat top waveform has a voltage level between two predetermined voltage levels for a predetermined interval during said half cycle;

second means for detecting said shift over a predetermined number of half cycles; and means, responsive to said first and second means, for producing a signal.

45. An arc fault detector according to claim 44, further comprising interrupting means, responsive to said signal, for interrupting current in said first and second lines.

46. An arc fault detector according to claim 45, wherein said interrupting means interrupts current to a load.

47. An arc fault detector according to claim 45, wherein said interrupting means interrupts current by activating a crowbar across said first and second lines, thereby creating a short circuit between said first and second lines to activate a circuit breaker upstream of a location of said detected arc fault.

48. An arc fault detector according to claim 45, wherein said interrupting means interrupts current by introducing a ground fault into a GFCI breaker upstream of a location of said detected arc fault.

49. An arc fault detector according to claim 45, wherein said interrupting means interrupts current by triggering a command signal to activate a circuit breaker upstream of a location of said detected arc fault.

50. An arc fault detector according to claim 49, wherein said command signal is carried to said circuit breaker by power line carrier transmission.

* * * * *